United States Patent [19]

Vollmer et al.

[11] Patent Number: 5,365,287
[45] Date of Patent: Nov. 15, 1994

[54] THREE COLOR CHANNEL, TWO-ELEVATION OPTICS FOR A SINGLE LENS VIDEO PROJECTOR

[75] Inventors: David W. Vollmer, Santa Cruz; Rodney J. Kugizaki, San Ramon, both of Calif.

[73] Assignee: Greyhawk Systems, Inc., Mountain View, Calif.

[21] Appl. No.: 148,933

[22] Filed: Nov. 8, 1993

[51] Int. Cl.$^5$ .............................................. G03B 21/00
[52] U.S. Cl. ........................................ 353/31; 353/38; 353/34; 353/20; 359/40; 348/757
[58] Field of Search .................. 353/31, 33, 34, 37, 353/98, 20; 348/757, 756, 779, 780, 781, 782; 359/40

[56] References Cited

U.S. PATENT DOCUMENTS

| | | |
|---|---|---|
| 4,019,807 | 4/1977 | Boswell et al. |
| 4,191,456 | 3/1980 | Hong ............................ 353/31 |
| 4,425,028 | 1/1984 | Gagnon et al. ................ 353/31 |
| 4,464,018 | 8/1984 | Gagnon . |
| 4,500,172 | 2/1985 | Gagnon ........................ 353/31 |
| 4,749,259 | 6/1988 | Ledebuhr ..................... 353/33 |
| 4,826,311 | 5/1989 | Ledebuhr ..................... 353/33 |
| 4,836,649 | 6/1989 | Ledebuhr et al. ............ 353/31 |
| 4,909,601 | 3/1990 | Yajima et al. ................ 353/31 |
| 5,098,183 | 3/1992 | Sonehara ..................... 353/31 |
| 5,221,982 | 6/1993 | Faris ............................ 353/31 |
| 5,245,449 | 9/1993 | Ooi et al. .................... 353/31 |

FOREIGN PATENT DOCUMENTS 5053224 3/1993 Japan ............................ 353/20

Primary Examiner—William A. Cuchlinski, Jr.
Assistant Examiner—William C. Dowling
Attorney, Agent, or Firm—Flehr, Hohbach, Test, Albritton & Herbert

[57] ABSTRACT

A high-efficiency optical system for use in a liquid-crystal light-valve video projector. High intensity, unpolarized white light is separated into primary color components by color-selective filters transmitting light containing both first and second polarization states. Light of each primary color is characterized by a wavelength passband whereby the endpoints of the passband are defined by first and second wavelengths. The second passband endpoint of the first polarization state of the first primary color overlaps the first passband endpoint of the second polarization state of the second primary color, and the second passband endpoint of the second polarization state of the second primary color overlaps the first passband endpoint of the first polarization state of the third primary color. In addition, the video projector design utilizes low f/# optics in conjunction with absorptive polarizers to remove residual light of an unwanted polarization state allowed into the system by the low f/# optics. This allows high brightness with high efficiency and without sacrificing contrast.

10 Claims, 2 Drawing Sheets

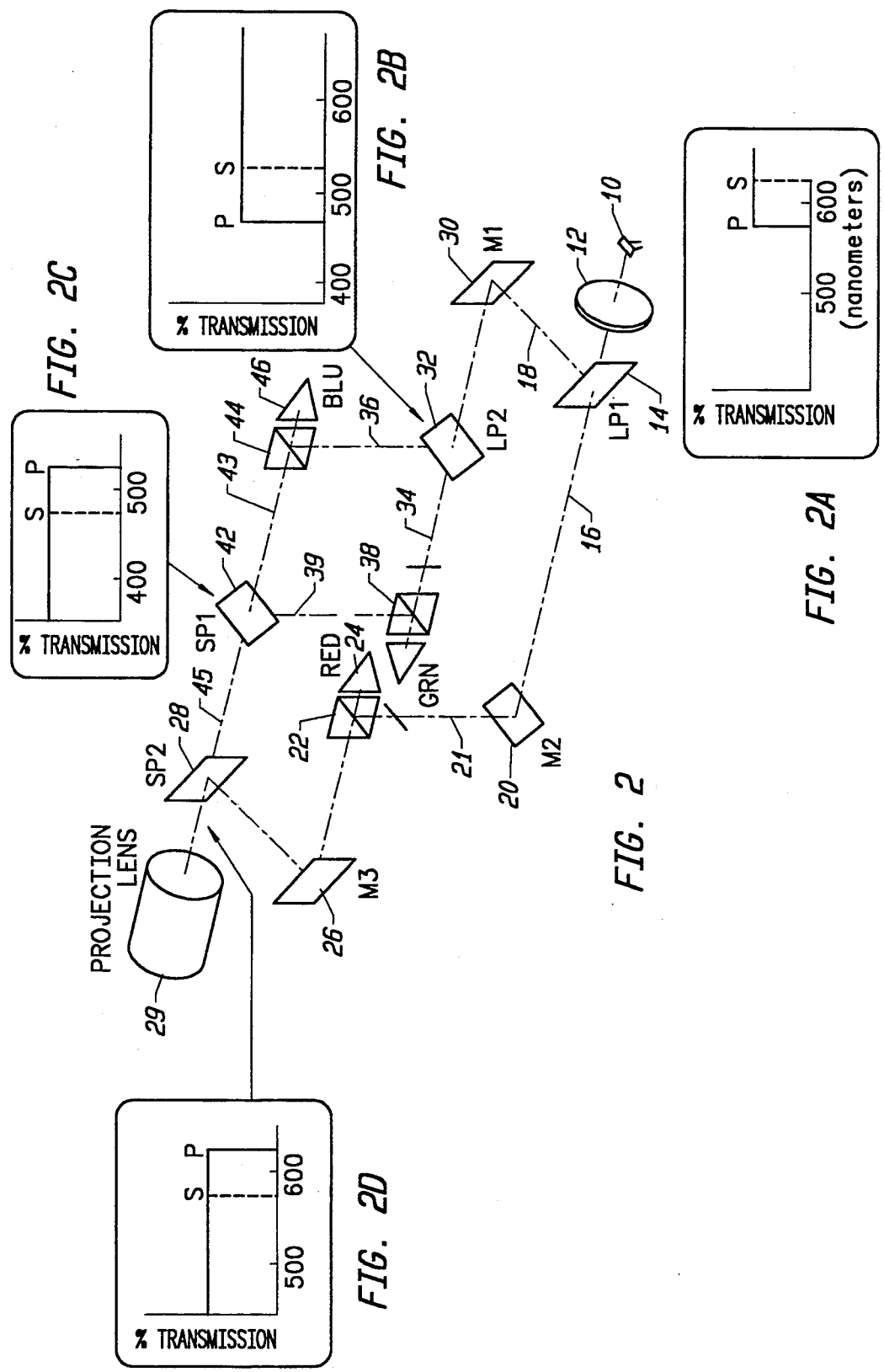

THREE COLOR CHANNEL, TWO-ELEVATION OPTICS FOR A SINGLE LENS VIDEO PROJECTOR

CROSS-REFERENCE TO RELATED APPLICATION

Reference is made to OPTICS FOR A SINGLE-LENS VIDEO PROJECTOR WITH COLOR-SPECIFIC POLARIZATION CHANNELS, Ser. No. 08/148,479, filed on the same date as the instant invention, having one common inventor and a common assignee.

BACKGROUND OF THE INVENTION

Field of the invention: The present invention relates generally to brightness and contrast improvements in compact liquid crystal light valve based video projection systems. More particularly, the invention relates to a compact optical design that retains the color pass band overlap of the copending application referenced above.

The above identified co-pending application, describes a projection system with three color primary light paths, three light valve modulators and a single projection lens. This system has a low f/# and color passband overlap to improve brightness efficiency. However, the projector described in Haven, et. al. requires long optical paths due to the coplanar geometry of the optics together with the use of CRTs as modulators for the liquid crystal light valves. The long necks of the CRT modulator intrude into the illumination or projection light path unless long optical paths are used. But to do this causes the optical elements to be large and expensive, and it adds overall size and weight to the projector. The coplaner geometry also requires inefficient waveplates to rotate or retard the light to allow wavelength passband overlap.

U.S. Pat. No. 4,749,259, issued to Ledebuhr, describes a single-lens light valve projection system on one plane. The optical system is immersed in a bath of high refractive-index fluid to form index-matched, color selective polarizing beam splitters. The fluid also has the effect of making the geometric path length shorter.

U.S. Pat. No. 4,425,028, issued to Gagnon, describes a compact projector system. This optical design uses plate prepolarizing beam splitters immersed in high refractive index fluid. The advantage of this design is that it allows high contrast and is compact in size and configuration.

U.S. Pat. No. 4,826,311, issued to Ledebuhr, teaches a single light-valve, multiple projection lens projection system on two levels, but requires a complex and expensive arrangement of prisms and periscopes.

U.S. Pat. No. 4,191,456, issued to Hong, teaches compact full-color, single projection system where the projection optics and light valve modulators are on a first elevation and the illumination optics are on a second elevation.

All described prior art utilizing a single projection lens rejects one polarization state by means of a reflective polarizing prism before the primary colors are segregated by dichroic filters. Therefore, there can be no overlap in the passbands and brightness efficiency will be lower than that of the present invention. In addition, none teach configurations useful in eliminating wave retarding plates.

SUMMARY OF THE INVENTION

It is an object of the invention to provide a compact and inexpensive optical design for a video projector while preserving the gains in efficiency of the color passband overlap and low f/# as described in the co-pending application referenced herein.

It is another object of the invention to provide an optical design that allows color passband overlap without the use of wavelength retarder plates.

It is yet another object of the invention to provide a video projector optical layout with overlapping color passbands that uses only long and short pass dichroic filters.

The above objectives may be obtained by video projector layout having no more than two color channels on a first optical plane and the third color channel on a second optical plane.

In a preferred embodiment, either the red or the blue channel is on one plane and the other two color channels are on a second plane and only long and short pass dichroic filters are used for color separation.

BRIEF DESCRIPTION OF THE DRAWINGS

The present invention will be described in more detail in connection with the drawing, wherein:

FIG. 2 is an optical schematic of a preferred embodiment of the invention.

DETAILED DESCRIPTION OF THE INVENTION

Figure 1:
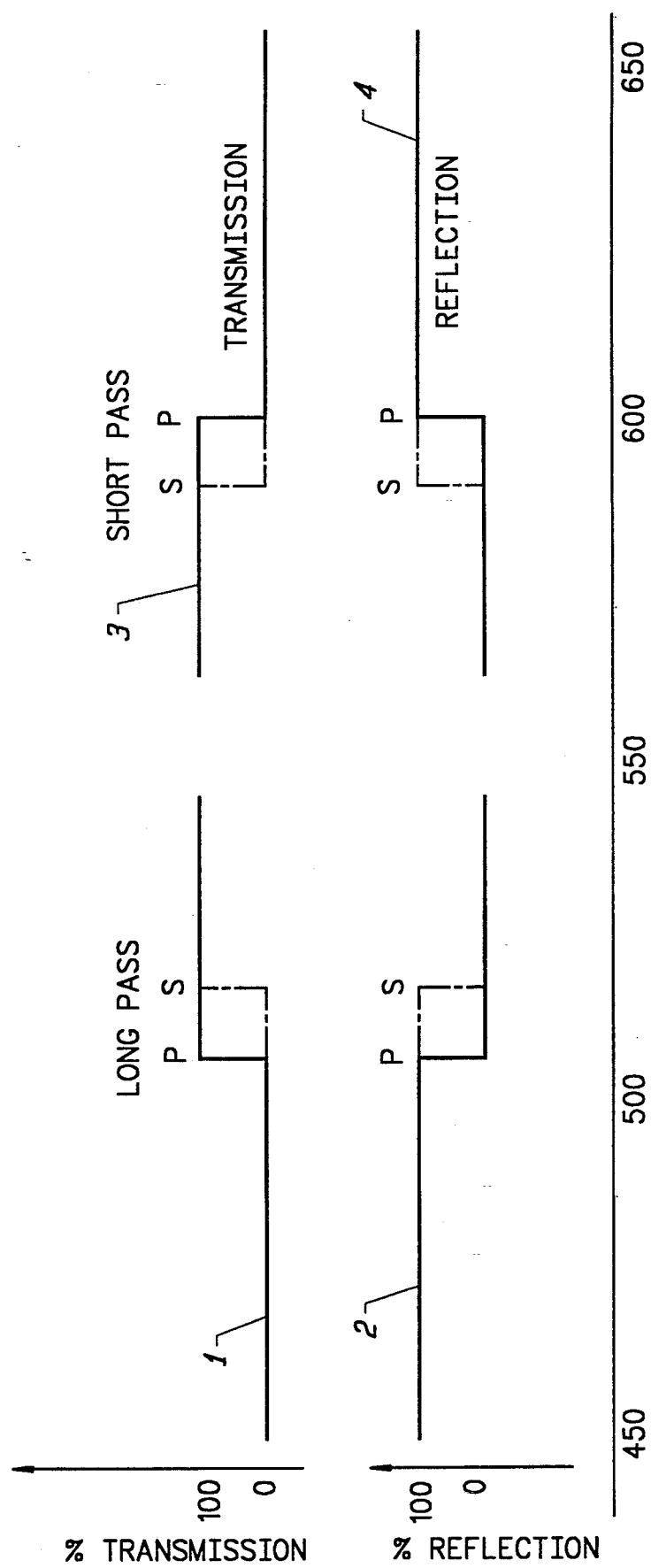
FIG. 1 is a graph showing the pass bands for different polarization light of the dichroic filters used in the invention.

Light which is perceived visually as blue may contain wavelengths that are also contained in light which is perceived as green. Similarly, light which is perceived visually as red may contain wavelengths that are also contained in light which is perceived as green.

Immediately prior to modulation, each primary light channel can contain only one polarization state. However, if the red and blue channel are of the same polarization state and the green is of the opposite polarization state, then it is possible to overlay portions of the red and green and blue and green spectrums by using both polarization states in the overlap area. This has the effect of increasing the amount of total optical energy projected to the screen.

The ability to create passband overlaps of the primary colors, relies on a known but rarely used characteristic of dichroic beam splitters. It is well known that when angled with respect to a light beam, dichroic beam splitters split the entering beam into two parts, one made up of short wavelengths and the other made up of long wavelengths. But, in addition, nearly all dichroic beam splitters have the added property of splitting light having the electric vector in the plane of incidence (P-polarized light) at a different wavelength than light having the electric vector perpendicular to the plane of incidence (S-polarized light).

For a dichroic filter that transmits long wavelengths and reflects short wavelengths, the transmitted S-polarized light commences at a longer wavelength than the transmitted P-polarized light. This is illustrated in FIG. 1 by curve 1 for transmitted light and curve 2 for reflected light.

For a filter that transmits short wavelengths and reflects long wavelengths, the transmitted S-polarized light cutoff is at a shorter wavelength than the transmitted P-polarized light cutoff. This is illustrated in FIG. 1 by curve 3 for transmitted light and curve 4 for reflected light.

The transmission and reflection of both types of filters is shown in FIG. 1 in idealized form with wavelength in nanometers on the horizontal axis and percent reflection and percent transmission on the vertical axis. Of course, real filter would have continuous curves rather than the right angle cutoffs shown. For a dichroic (non-absorbing) filter, the reflected light plus the transmitted light equals all of the light at any wavelength. Thus the curves are equal and opposite.

FIG. 2 illustrates a preferred embodiment of the present invention. Referring now to FIG. 2, lamp 10 is a high-intensity Xenon or metal-halide lamp. Condensing lens 12 focusses the image of source 10 at the plane of liquid crystal light valves 24, 40 and 46. The focal distance from lens 12 to the plane of light valves 24, 40 and 46 is equidistant.

White light from lamp 10 is separated by long pass dichroic filter 14 into light of a first color channel 16 containing the red band of the visible spectrum and a second color channel 18 containing the blue and green bands of the visible spectrum. At this point, the light in both channels 16 and 18 contain both S- and P-polarization states. No optical energy has been thrown away.

Red light 16 is deflected 90 degrees by dichroic turning mirror 20 to polarizing prism 22 where P-polarized light is passed through the prism and out of the optical system. S-polarized light is reflected by prism 22 to light valve 24 where it is phase modulated between the S- and P-polarization states in accordance with the image presented to the input of the light valve.

The light valves utilized in this invention are multilayered, planar structures consisting of a liquid crystal layer, a reflective dielectric mirror, a light-blocking layer, and a photoconductive layer all disposed between transparent, conductive layers on glass substrates. When a spatially variable, amplitude modulated pattern of light from an addressing source such as a CRT is focused on the photoconductive layer, it is transformed into a nearly identical pattern in the liquid crystal layer. The liquid crystal modulates the polarization state of a high-intensity projection light to form a replica of the addressing light pattern. This light-valve is described by Boswell in U.S. Pat. No. 4,019,807.

The modulated light from light valve 24 is analyzed by polarizing prism 22. That is, S-polarized light is reflected back to illumination source 10, and the P-polarized light is transmitted through. The P-polarized light is passed by dichroic turning mirror 26 and reflected by short pass combining filter 28 and focussed by projection lens 29 onto viewing surface not shown to form a light and dark pattern of red light.

Light in the second color channel 18 is reflected from dichroic turning mirror 30 onto long pass dichroic filter 32 transmits green light and reflects blue light 36. Green light 34 is polarized by polarizing prism 38 such that the S-polarized light is reflected out of the system and the P-polarized light is transmitted through to light valve 40 where it is phase modulated between the S- and P-states in accordance with the image presented to the input of the light valve. The image pattern is analyzed by polarizing prism 38 by passing P-polarized light back into illumination source 10 and reflecting S-polarized light. The S-polarized green light from prism 38 is first reflected from short pass combining filter 42 and then transmitted by long pass combining filter 28, and then passed through projection lens 29 onto the viewing screen. The result is a pattern of varying intensity of the primary color green.

Blue light 36 is projected to polarizing prism 44 where the P-polarized component is transmitted through and out of the optical system. S-polarized light is reflected to light valve 46 which phase modulates the incoming S-polarized light between the S- and P-polarized states. The image pattern is analyzed by polarizing prism 44 by reflecting S-polarized light back to illumination source 10 and passing P-polarized light on to short pass combining filter 42.

Modulated blue, P-polarized light is combined with modulated green, S-polarized light at combining short pass filter 42. The combined blue and green polarized light are combined with the modulated red, P-polarized light at short pass combining filter 28 and passed on to projection lens 29. The result is a full color video image.

Each of the primary colors is composed entirely of light of a single polarization state with the green band being opposite to red and blue and the cutoff frequencies of each band chosen to provide overlap of blue and green and of red and green. No retarding waveplates were necessary. And the design is compact. This was accomplished by utilizing the orientation sensitivity of dichroic filters and arranging the optical elements on two optical planes.

One aspect of the present invention is based on the well known orientation sensitivity of dichroic filters to polarization states of light. For example, in one orientation, a dichroic filter may perceive polarized light as S-polarized. But if the dichroic filter is rotated 90 degrees, it perceives the exact same light as P-polarized. This characteristic is used to eliminate the need for rotating wave plates as required in other devices.

A first optical plane consists of the following optical elements in FIG. 2: light source 10, condensing lens 12, dichroic filter 14, turning mirror 20, polarizing prism 22 with its liquid crystal light valve modulator 24 and turning mirror 26. A second optical plane consists of the following optical elements in FIG. 2: turning mirror 30, dichroic mirror 32, polarizing prism 38 and its associated modulator 40, polarizing prism 44 and its associated modulator 46, dichroic filters 42 and 28 and projection lens 29.

FIGS. 2(a) through 2(d) are useful in explaining how the overlap of the high end of the blue band with the low end of the green and the high end of the green with the low end of the red band are possible without the use of retarding plates. Each of the graphs is a plot of light intensity as a function of wavelength in nanometers. The cutoff points of the curves are idealized to simplify explanation. In reality, each of the curves is continuous. Dichroic filter 14 is a long pass filter and its characteristic is shown in FIG. 2(a). As can be seen, dichroic filter 14 passes all P-polarized light above the frequency of 580 nanometers and all S-polarized light above 620 nanometers. This of course means that dichroic filter 14 reflects all P-polarized light below 580 nanometers and all S-polarized light below 620 nanometers. The wavelength band where there is potential for overlap between red and green is from 580 to 620 nanometers. Thus light with one polarization in this band must be present at the red channel modulator 46 and light of the opposite polarization in this band must be present at the green channel modulator.

In the case of red, the optical system of FIG. 2 provides P-polarized light from 580 nanometers and from 620 nanometers for S-polarized light after dichroic filter 14. However, the plane of incidence of the turning mirror 20 is in a plane orthogonal to the plane of incidence of the dichroic filter 14, and thus it treats P-polarized light as S-polarized light and visa versa. Thus, the light leaving turning mirror 20 is S-polarized from 580 nanometers and P-polarized from 620 nanometers. Thus a rotating plate is avoided by a turning mirror with a plane of incidence orthogonal to the plane of incidence of the dichroic filter.

In the green and blue channel 18, turning mirror 30 is in a plane parallel to dichroic filter 14. Thus, there is no reversal of polarization. However, the plane of incidence of the light on filter 32 is perpendicular to the plane of incidence of the light on filters 14 and 30. Thus, there is a reversal of polarization. Dichroic filter 32 passes P-polarized light from 480 nanometers and up. However, the high end has been removed by dichroic filter 14 as previously described. This light is transmitted through polarizing prism 38 and reflected by modulator 40 which also acts to rotate the polarization vectors again. Thus the P-polarized light from 480 nanometers up becomes S-polarized light at reference numeral 39.

At reference numeral 36, the blue contains S-polarized light from 520 nanometers and down and P-polarized light from 480 nanometers down. The polarization vectors are rotated by modulator 46 so that the blue channel at reference numeral 43 contains P-polarized light from 520 nanometers down.

Dichroic combining filter 42 is a short pass filter with the characteristic shown in FIG. 2(c). Because dichroic combining filter 42 is in the same plane as dichroic filter 32, there is no polarization vector rotation. Thus, the optical energy between 480 and 520 nanometers in blue channel 43 is P-polarized light. The optical energy between 480 and 520 nanometers in the green channel 39 is S-polarized light. Thus they may be added by combining filter 42 which reflects S-polarized light from 480 nanometers and up and passes P-polarized light from 520 nanometers down.

Dichroic combining filter 28 is a short pass filter with the characteristic shown in FIG. 2(d). It reflects S-polarized light from 580 nanometers up and P-polarized light from 620 nanometers up. The optical energy in the red channel between 580 and 620 nanometers is S-polarized. The optical energy in the blue green channel 45 between 580 and 620 nanometers is P-polarized. Thus, they may be added by element 28.

What is claimed is:

1. A video projector for producing a full color video image from three separate color channels each of said channels including a polarization modulating light valve, said projector comprising:
   a source of white light;
   a first optical color channel carrying light of a first color passband and being of a first polarization state, said first color passband encompassing the relatively long wavelengths in said color image and being on a first optical plane;
   a second optical color channel carrying light of a second color passband and being of said first polarization state, said second color passband encompassing the relatively short wavelengths in said color image and being on a second optical plane;
   a third optical color channel carrying light of a third color passband and being of a second polarization state, said third color passband overlapping at lease one of said first or second passbands;
   combining means for combining the images from said first, second and third color channels into a composite image; and
   projection means for projecting said composite image onto an image plane.

2. The video projector of claim 1 wherein said third color passband overlaps both said first and said second color passbands.

3. The video projector of claim 1 wherein said light valve is a liquid crystal light valve.

4. The video projector of claim 1 wherein at least one of said three color channels has an absorbing sheet polarizer therein.

5. The video projector of claim 2 wherein the f/# of said projector is no greater than 5.

6. A video projector for producing a full color video image from separate red, green and blue color channels, comprising:
   a source of white light;
   a first dichroic filter positioned to receive said white light and adapted to isolate and direct light of a first color into a first primary color channel and the remaining light into a residual channel containing the remainder of said color spectrum;
   a second dichroic filter positioned to receive light from said residual channel, and adapted to isolate a second primary color and direct it into a second primary color channel and the remaining light into a third primary color channel;
   an absorptive sheet polarizer, positioned in at least one of said primary color channels and adapted to absorb light in a preferred polarization state and to pass all other light;
   first, second and third polarizing prisms, one positioned in each of said primary color channels;
   first, second and third polarization modulating light valves, one positioned in each of said primary color channels;
   combining means for combining the images from said first, second and third color channels into a composite image; and
   projection means for projecting said composite image onto an image plane.

7. The video projector of claim 6, wherein the f/# of the optics thereof is no greater than 5.

8. The video projector of claim 6, wherein said light valves are liquid crystal light valves addressed by cathode ray tubes.

9. The video projector of claim 6 further characterized by the addition of polarization shifting means for rotating the polarization of light impinging thereon by 90° to one or more of said primary color channels whereby the polarization state of said green channel is different than the polarization state of said red and blue channel.

10. A video projector comprising:
   a source of projection light containing substantially the entire visible spectrum;
   a reflector of substantially elliptical shape positioned to capture a portion of the light from said projection light source and to reflect said light at a focal point;
   a condensing lens positioned beyond the focal point of said reflector and intercepting substantially all of the reflected light from said reflector, said condensing lens adapted to form a first light beam;

a first dichroic beam splitter positioned in the optical path of said first light beam and adapted to divide said first light beam into a second light beam containing a single primary color and a third light beam containing the remaining primary colors;

a first sheet polarizer positioned in the optical path of said second light beam and adapted to transmit a substantial portion of said second beam with an S-polarization state and absorb a substantial portion of light in said second light beam with a P-polarization state;

a first polarization modulator positioned to receive said second light beam and adapted to modulate the polarity thereof with signal information;

a first polarizer-analyzer positioned in the optical path of said second light beam between said first sheet polarizer and said first polarization modulator and adapted to reflect light in an S-polarization state only onto said first polarization modulator and to analyze said light beam reflected from said first polarization modulator such that said second light beam reflected from said first polarizer analyzer is amplitude modulated;

a first mirror positioned in the optical path of said third light beam subsequent to said first dichroic beam splitter, said first mirror adapted to cause the energy in said P polarization state to become S polarized and the energy in said S polarization state to become P polarized;

a second dichroic beam splitter positioned to receive said third light beam from said first mirror and adapted to divide said third light beam into a fourth light beam containing only one of said remaining primary colors and a fifth light beam containing the final primary color;

a second polarization modulator positioned to receive said fourth light beam and adapted to modulate the polarity thereof with signal information;

a second polarizer-analyzer positioned in the optical path of said fourth light beam between said second dichroic filter and said second polarization modulator and adapted to reflect light in a S polarization state only onto said second polarization modulator and to analyze said fourth reflected light beam reflected from said second polarization modulator such that said fourth light beam reflected from said second polarization modulator is amplitude modulated;

a second sheet polarizer positioned in the optical path of said fourth light beam before said second polarizer-analyzer and adapted to transmit a substantial portion of said fourth beam with a S polarization state and absorb a substantial portion of light in said fourth light beam with a P polarization state;

a third sheet polarizer positioned in the optical path of said fifth light beam and adapted to transmit a substantial portion of said fifth beam with a S polarization state and absorb a substantial portion of light in said fifth light beam with a P polarization state;

a third polarization modulator positioned to receive said fifth light beam and adapted to modulate the polarity of said beam with signal information;

a third polarizer-analyzer positioned in the optical path of said fifth light beam between a second dichroic beamsplitter and said third polarization modulator and adapted to transmit light in a P polarization state only onto said third polarization modulator and to analyze said fifth reflected light beam reflected from said third polarization modulator such that said fifth light beam reflected from said third polarization modulator is amplitude modulated;

a first beam combiner positioned in the optical paths of said fourth and fifth light beams and adapted to combine said fourth and fifth light beams into a sixth light beam that contains all of the information of said fourth and fifth light beams;

a second beam combiner positioned in the optical path of said second and sixth light beams and adapted to combine said second and sixth light beams into an eighth light beam contain all of the information in said second and sixth light beams; and a projection lens positioned in the optical path of said eighth light beam and adapted to focus said beam onto a projection plane.

* * * * *